(12) United States Patent
McKinzie

(10) Patent No.: US 10,408,325 B2
(45) Date of Patent: Sep. 10, 2019

(54) COOLING RING GEAR

(71) Applicant: Deere & Company, Moline, IL (US)

(72) Inventor: Kyle K. McKinzie, Altamont, KS (US)

(73) Assignee: DEERE & COMPANY, Moline, IL (US)

( * ) Notice: Subject to any disclaimer, the term of this patent is extended or adjusted under 35 U.S.C. 154(b) by 894 days.

(21) Appl. No.: 14/842,322

(22) Filed: Sep. 1, 2015

(65) Prior Publication Data
US 2017/0059030 A1    Mar. 2, 2017

(51) Int. Cl.
*F16H 55/17*    (2006.01)
*F16H 57/04*    (2010.01)

(52) U.S. Cl.
CPC ......... *F16H 55/17* (2013.01); *F16H 57/0431* (2013.01); *F16H 57/0473* (2013.01); *F16H 57/0482* (2013.01); *F16H 2055/176* (2013.01)

(58) Field of Classification Search
USPC ................................................ 475/159–160
See application file for complete search history.

(56) References Cited

U.S. PATENT DOCUMENTS

| | | | | |
|---|---|---|---|---|
| 3,425,301 A | * | 2/1969 | Shannon | F16H 1/2809 475/159 |
| 5,910,063 A | | 6/1999 | Kato | |
| 8,556,761 B1 | * | 10/2013 | Carlton | F16H 57/0486 475/159 |
| 8,858,388 B2 | * | 10/2014 | McCune | F01D 5/027 475/331 |
| 2005/0197226 A1 | | 9/2005 | Yamamura et al. | |
| 2008/0268997 A1 | | 10/2008 | Gooden | |
| 2010/0004085 A1 | * | 1/2010 | Haupt | F16H 57/08 475/159 |
| 2012/0329599 A1 | * | 12/2012 | Taniguchi | F16H 48/38 475/160 |
| 2013/0095974 A1 | * | 4/2013 | Imai | F16H 57/0479 475/159 |
| 2016/0369870 A1 | * | 12/2016 | Otsuki | F16H 57/0426 |

FOREIGN PATENT DOCUMENTS

| | | |
|---|---|---|
| DE | 10360693 A1 | 7/2005 |
| JP | H02173459 A | 7/1990 |
| JP | H06109105 A | 4/1994 |

OTHER PUBLICATIONS

Search Report for German Application No. P23253DEORDFDGh dated Mar. 27, 2017.

* cited by examiner

*Primary Examiner* — Colby M Hansen
(74) *Attorney, Agent, or Firm* — Klintworth & Rozenblat IP LLP

(57) ABSTRACT

A ring gear for a planetary gear set has an annular gear body with a first annular side and a second annular side concentric about a center axis. The first annular side defines a toothed periphery. The gear body may include an annular groove in the first annular side proximate a first axial side of the gear body. An axial flow passage section may extend axially into the gear body from the annular groove without intersecting the first and second annular sides. A radial flow passage section extends radially into the gear body from the second annular side to the axial flow passage section.

6 Claims, 6 Drawing Sheets

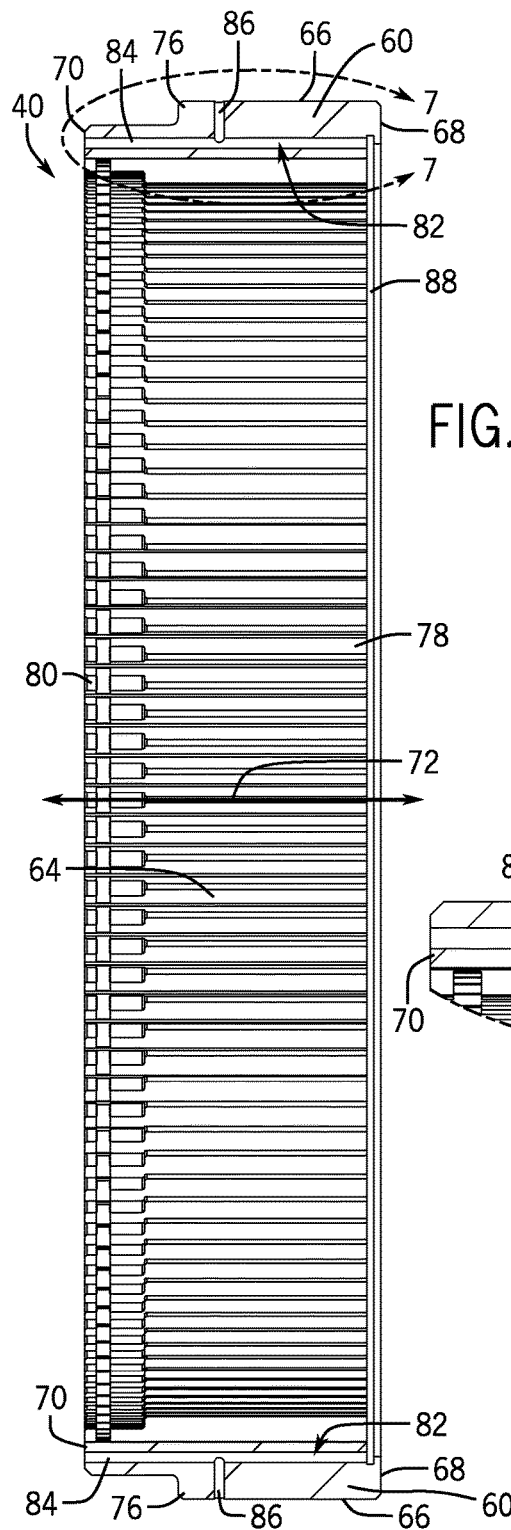
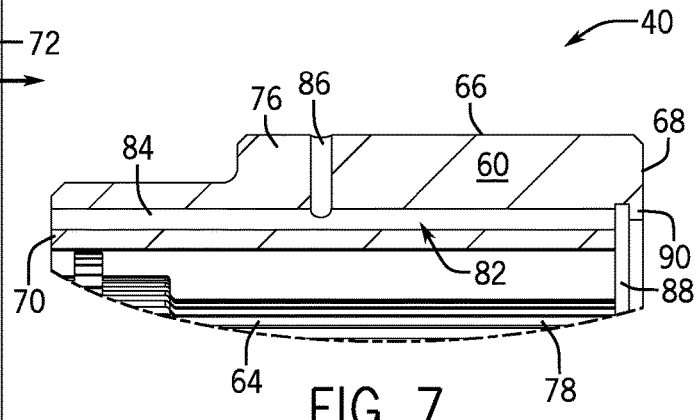
FIG. 6
FIG. 7

COOLING RING GEAR

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to planetary gear sets, such as used in various transmission assemblies, and components of planetary gear sets that facilitate cooling fluid flow to one or more components of the transmission.

BACKGROUND OF THE DISCLOSURE

Transmission assemblies of various kinds for various work vehicles may include gears and associated components arranged to contact a fluid to dissipate heat and ease engagement of mating parts. Cooling is particularly important for certain heat generating components (e.g., brakes, clutch packs and the like). Certain transmission components may be configured or located (e.g., nested within other components) such that it may be difficult to adequately deliver the cooling fluid thereto. The tight packaging of one or more planetary gear sets within the transmission may also inhibit cooling fluid from being routed to certain components.

In some cases, certain transmission components may have been cast or machined to provide coolant passages designed to allow fluid to be delivered to components in otherwise less accessible areas inside the transmission. For example, a ring gear may include radial through bores extending from its inner diameter to its outer diameter to route fluid to a disc pack splined to the ring gear. Since ring gears have teeth along the outer or inner annular peripheries, radial through bores of this type may interfere with the tooth profiles that may lead to stress risers in the areas of engagement, especially if the bores are not closely clocked to the tooth root.

SUMMARY OF THE DISCLOSURE

This disclosure provides a ring gear configuration, such as may be used in a planetary gear set of a transmission assembly to facilitate cooling fluid flow to one or more components of the transmission.

In one aspect the disclosure provides a ring gear for a planetary gear set that has an annular gear body with a first annular side and a second annular side concentric about a center axis. The first annular side defines a toothed periphery. An axial flow passage section extends axially through the gear body from the annular groove without intersecting the first and second annular sides. A radial flow passage section extends radially into the gear body from the second annular side to the axial flow passage section.

In another aspect the disclosure provides a planetary gear set that has an arrangement of gears, including at least one ring gear arranged for relative rotational engagement with a planet carrier or planet gears. The at least one ring gear is an annular gear body having a first annular side and a second annular side concentric about a center axis. The first annular side defines a toothed periphery engaging the carrier or the planet gears. The gear body includes an annular groove in the first annular side proximate a first axial side of the gear body. An axial flow passage section extends axially through the gear body from a second axial side to the annular groove without intersecting the first and second annular sides. A radial flow passage section extends radially into the gear body from the second annular side to the axial flow passage section.

In still another aspect the disclosure provides a transmission arrangement including a housing, at least one disc pack having a set of friction discs and a set of disc plates interleaved with the set of friction discs, one set being fixedly mounted to the housing, and a planetary gear set, including at least one ring gear arranged for relative rotational engagement with a planet carrier or planet gears. The at least one ring gear is an annular gear body having a first annular side and a second annular side concentric about a center axis. The first annular side defines a toothed periphery engaging the carrier or the planet gears. The gear body includes an annular groove in the first annular side proximate a first axial side of the gear body. An axial flow passage section extends axially through the gear body from a second axial side to the annular groove without intersecting the first and second annular sides. A radial flow passage section extends radially into the gear body from the second annular side to the axial flow passage section.

The details of one or more implementations or embodiments are set forth in the accompanying drawings and the description below. Other features and advantages will become apparent from the description, the drawings, and the claims.

BRIEF DESCRIPTION OF THE DRAWINGS

FIG. 6 is a cross-sectional view of the example cooling ring shown in FIGS. 4 and 5 as taken along line 6-6 of FIG. 4; and FIG. 7 is an enlarged cross-sectional detail view of the area 7-7 of FIG. 6.

Like reference symbols in the various drawings indicate like elements.

DETAILED DESCRIPTION

Figure 1:
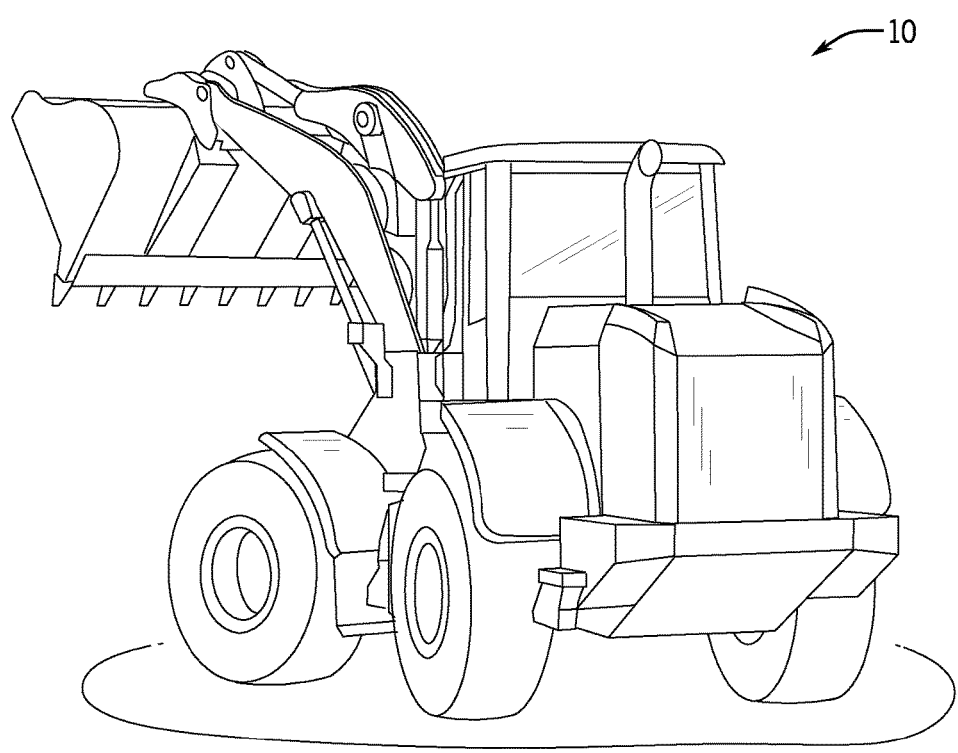
FIG. 1 is an isometric view of a work vehicle in which embodiments of a transmission arrangement containing a planetary gear train may be included, as illustrated in accordance with an example embodiment of the this disclosure.

The following describes one or more example embodiments of the disclosed cooling ring gear, as shown in the accompanying figures of the drawings described briefly above. Various modifications to the example embodiments may be contemplated by one of skill in the art.

The following describes embodiments of a cooling ring gear well-suited for usage within a transmission arrangement containing a planetary gear train (referred to herein as a "planetary transmission"), such as a planetary transmission in the drivetrain of a work vehicle. The cooling ring gear includes coolant flow passages, which are strategically routed through the ring gear body to avoid penetration of the gear teeth. During high speed rotation of the cooling ring gear, oil or another coolant is conducted through the flow passages under the influence of centrifugal forces and is ultimately expelled from the ring gear at a desired discharge location. The desired discharge location may be, for example, the outer circumferential surface of the ring gear to direct the coolant into nearby components of the transmission (e.g., surrounding annular friction packs), which may otherwise be difficult to supply with active coolant flow. In so doing, the cooling ring gear may improve the thermal performance of the planetary transmission, while promoting the thorough distribution of lubricating coolant to minimize wear and prolong the operational lifespan of the transmission components. Furthermore, locating the flow passages of the ring gear to avoid penetrating the gear teeth reduces the occurrence of heightened localized stresses in the force-transmitting meshing surfaces of the teeth, which could otherwise comprise the gear teeth. Moreover, this also eliminates the need to precisely locate (e.g., utilizing a jig or other specialized fixture) radial through bores at the tooth root (or valley) in order to prevent the inadvertent penetration of the meshing tooth surfaces.

The coolant flow passages of the cooling ring gear may follow any path and have any geometry, disposition, and dimensions suitable for conducting coolant from a location adjacent the ring gear, through the body of the ring gear, and to a desired discharge location. In one embodiment, and by way of non-limiting example, each coolant flow passage may include: (i) an axial section extending axially into the gear body from an axial side face of the ring gear, and (ii) a radial section extending radially into the gear body from an annular side of the ring gear, which in certain embodiments may be an outer circumference side or surface. The radial flow passage section may extend from a non-toothed periphery of the gear body, such as a splined periphery, into the gear body at a controlled depth and location sufficient to intersect the axial flow passage section, while not fully penetrating through the entire radial dimension of the gear body. In this manner, it may be ensured that the coolant flow passages do not extend to the opposite annular side (e.g., an inner circumferential side or surface) of the ring gear, which may be toothed or include a toothed peripheral region for meshing engagement with planetary gears. Additionally, in certain embodiments, the cooling ring gear may further include an annular groove or other coolant collection feature, which intersects the axial section of the coolant flow passages and provides a small reservoir of coolant from which the flow passages may draw coolant. In so doing, such a coolant collection feature may provide a pressurizing function and help direct additional coolant flow into the axial flow passages to enhance the lubricant distribution capabilities of the ring gear.

As used herein, the term "axial" refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction.

Additionally, the term "annular" (and derivatives) are used herein to refer to the radial sides or surfaces of an annulus, for example, the outward and inward facing sides or surfaces of an annular body. In the case of an annular body that is symmetric about a central reference axis or centerline, these annular sides and surfaces may correspond with circumferential sides or surfaces thereof, which may also be considered the inner and outer diameter sides or surfaces.

Referring to the drawings, an example embodiment of the disclosure will now be described in detail. FIG. 1 is an isometric view of a front end wheel loader 10 containing a planetary transmission in which embodiments of the cooling ring gear are usefully included. As shown in FIG. 1, a wheeled loader 10 is provided by way of contextual example only. It will be appreciated that embodiments of the cooling ring gear described herein are not restricted to usage in any particular planetary gear set, planetary transmission, or type of vehicle or platform, including other work vehicles used in the agriculture, construction and forestry industries. Embodiments of the cooling ring gear may be beneficially utilized within the planetary transmission of a work vehicle, such as the wheeled loader 10, as such transmissions may require relatively robust cooling and lubrication systems. Further, the planetary transmissions of work vehicles commonly contain certain components (e.g., brake packs) that are positioned around or otherwise located proximate a planetary gear set, that are prone to the generation of excess heat during operation of the transmission, and that have traditionally been challenging to supply with active coolant flow during operation of the planetary transmission.

Figure 2:
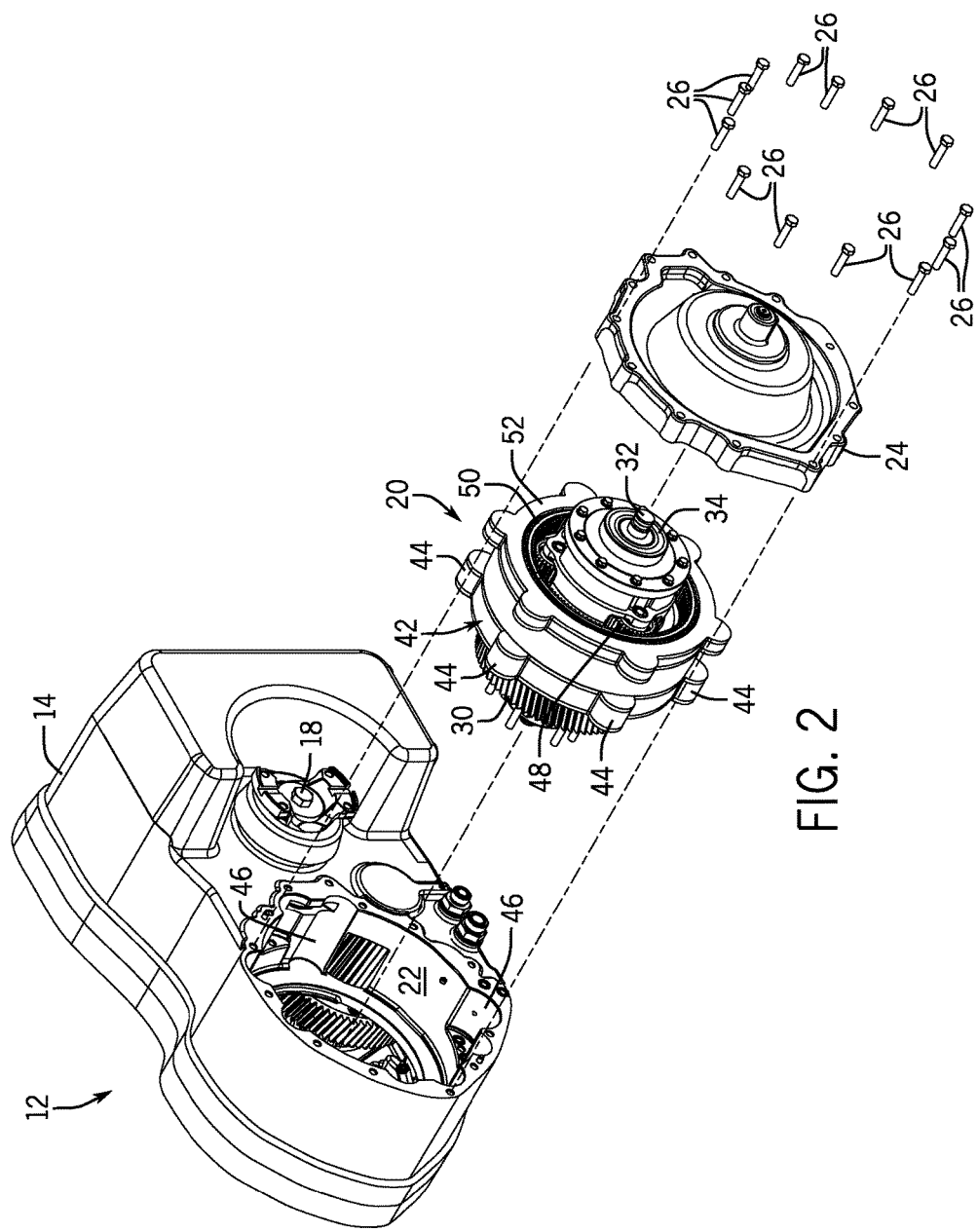
FIG. 2 is a partially exploded view of a planetary transmission that may be included within the work vehicle shown in FIG. 1.

FIG. 2 shows an example planetary transmission 12 that may be included in the wheeled loader 10. In this particular example, the planetary transmission 12 may be a 3-speed power shift transmission; however, the particular type, construction, and functionality of the planetary transmission 12 is largely incidental and will only be described briefly herein. Generally, the planetary transmission 12 includes a housing 14, a drive motor (not shown) supported by the housing 14, and a first output shaft 18. Although hidden from view in FIG. 2, the planetary transmission 12 may also include a second output shaft, which may be the same the output shaft 18, but which extends from the opposite side of the housing 14. A gear train may be contained within the planetary transmission 12 that mechanically links the drive motor to the output shafts 18. As may be seen in the partial exploded view of FIG. 3, the gear train may include a planetary gear module or "planetary gear set 20." The planetary gear set 20 is matingly received within a compartment or chamber 22, and enclosed by a cover 24 attached to the housing 14, for example, by a plurality of bolts 26 or other such fasteners.

The planetary gear set 20 may include an input gear 28 and an output gear 30, which may be spur and helical gears, respectively. The input gear 28 engages the output shaft (not shown) of the drive motor, while the output gear 30 engages additional gearing within the planetary transmission 12 linking the planetary gear set 20 to the output shafts 18. The input gear 28 of the planetary gear set 20 is fixedly joined to a central shaft 32, which extends longitudinally through the planetary gear set 20. As may be seen in FIG. 2, a rolling element (e.g., ball) bearing 34 may be disposed around the opposing terminal end of the shaft 32 and received within an annulus provided in the cover 24.

The shaft 32 is fixedly connected to a sun gear (hidden from view in FIGS. 2-3) contained within the planetary gear set 20, which engages a number of planet gears 36 supported by a planet carrier 38. The planetary gear 36 further engage a cooling ring gear 40, which circumscribes the planet carrier 38 and which is splined to a first disc pack 42, which may serve as a first range brake pack for the transmission. The construction of the disc pack 42 may vary amongst embodiments. However, by way of example, the disk pack 42 may include relatively thick backer plates, relatively thin separator plates positioned between the backer plates, friction discs interleaved with the separator plates, and springs (not shown) biasing the separator plates and friction discs toward a non-contacting position. As will be described more fully below, the cooling ring gear 40 may have a splined outer circumferential surface that engages the friction discs of the disc pack 42 in a rotationally fixed relationship such that the cooling ring gear 40 and the friction discs of the disc pack 42 co-rotate when the planetary gear set 20 is driven. Conversely, the backer and separator plates are joined in a stacked configuration by a number of fasteners and include radial projections or lobes 44, which engage corresponding recesses provided in the chamber 22 (two of which are identified in FIG. 2 by reference numerals "46"). During operation of the planetary transmission 12, a non-illustrated actuator (e.g., hydraulic-actuated annular pistons) may selectively exert an axially-compressive force across the disc pack 42 to slow or stop the rotation of the friction discs and, therefore, the rotation of the cooling ring gear 40.

The planetary gear set 20 may include numerous other components that may vary amongst embodiments and that will not be described in detail herein. It is noted briefly, however, that such components may include an additional carrier and supported planetary gears (collectively identified in FIG. 2 by reference numeral "48"), an additional ring gear (identified in FIG. 2 by reference numeral "50"), one or more additional multi-lobed disc packs (one of which is identified in FIG. 2 by reference numeral "52" and another of which is within the interior of the planetary gear set 20), various housing elements, fasteners, and rolling element (e.g., ball and/or roller) bearings. Additionally, while a single cooling ring gear 40 is shown in the illustrated example, further embodiments of the planetary gear set 20 and, more generally, the planetary transmission 12 may include two or more cooling ring gears and various other coolant distribution features, such as shaft-driven pumps, plumbing, and the like.

The disc pack 42 may generate a considerable amount of heat when utilized to slow or stop the rotation of the cooling ring gear 40. Even when the disc pack 42 is disengaged, excess heat may be generated by friction between the separator plates and the rapidly rotating friction discs of the disc pack 52. It is thus desirable to dissipate such excess heat by contacting the disc pack 42 with an active flow of liquid coolant, such as a suitable oil. However, due to the relatively tight packaging of the transmission components, it may be difficult or impractical to deliver coolant flow to the interior of the disc pack 42 or other internal components. For this reason, the cooling ring gear 40 is provided with one or more coolant flow passages and certain other features, which promote the flow of oil or another coolant from a collection area (e.g., axially) adjacent the cooing ring gear 40, through the body of the cooling ring gear 40, and to a desired discharge area, such as the outer annular or circumferential surface of the cooling ring gear 40, which may be splined to the disc pack 42. By virtue of this design, the cooling ring gear 40 may leverage centrifugal forces generated during rotation of gear 40 to continuously deliver coolant flow into the interior of the disc pack 42 for improved heat dissipation. Additionally, in embodiments wherein the coolant is oil or another liquid having lubricating properties, the coolant may further lubricate the disc pack 42 to reduce heat-generating friction, to minimize wear of the component of friction pack 42, and to prolong the serviceable lifespan thereof.

The cooling ring gear 40 will now be described in detail in conjunction with FIGS. 4-7. The following description is set-forth by way of example only and should be understood as providing a useful, but non-limiting illustration of one manner in which the cooling ring gear 40 may be implemented. In further embodiments, the cooling ring gear 40 may include various other structural features providing that the cooling ring gear 40 includes at least one toothed periphery (i.e., annularly arranged gear teeth) and at least one coolant flow passage, which has an inlet offset from the toothed periphery (that is, does not breach the gear teeth) into which coolant is drawn and an outlet through which coolant is discharged (e.g., in a radially outward direction) during rotation of the cooling ring gear 40. Furthermore, while the cooling ring gear 40 is primarily described herein as utilized to supply coolant to a surrounding brake pack to which the cooling ring gear 40 is splined (i.e., disc pack 42), embodiments of the cooling ring gear 40 may be adapted to supply coolant flow to various other components included within a planetary gear set or transmission, which are positioned proximate to the cooling ring gear 40 and which may or may not physically interface with the cooling ring gear 40.

Referring collectively to FIGS. 4-7, the cooling ring gear 40 includes an annular gear body 60 through which a central opening 62 is provided. The annular gear body 60 includes a first annular side, or inner circumferential surface, 64, a second annular side, or outer circumferential surface, 66, a first axial side face 68, and a second axial side face 70. The inner and outer circumferential surfaces 64 and 66 are concentric about the center axis or rotational axis of the cooling ring gear 40, as represented in FIG. 6 by double headed arrow 72. The axial side faces 68 and 70 are on opposite sides of the gear body 60 along the rotational axis 72.

The cooling ring gear 40 includes at least one toothed peripheral surface for meshing engagement with one or more gears. In certain embodiments, the cooling ring gear 40 may also include one or more splined regions to engage other components along a rotationally-fixed interface, which may or may not permit sliding movement when the planetary gear set 20 (FIGS. 2-3) is fully assembled. In the illustrated embodiment, specifically, the cooling ring gear 40 includes a splined peripheral region or "splined periphery" 76 provided around outer circumferential surface 66 for rotationally-fixed engagement with the splined interface of the disc pack 42 when the cooling ring gear 40 is installed within the planetary gear set 20. Additionally, the cooling ring gear 40 further includes a toothed periphery 78 provided around a first region of the inner circumferential surface 64 for meshing engagement with the planetary gears 36. Finally, the cooling ring gear 40 also includes an axially-compact splined periphery 80 provided around a second region of the inner circumferential surface 64 adjacent the toothed periphery 78. In the illustrated embodiment, the splined periphery 80 engages a mating splined region of the planet carrier 48 in a rotationally-fixed relationship when the planetary gear set 20 is assembled. However, the cooling ring gear 40 need not include the splined periphery 80 or any other splined sections in alternative embodiments.

As identified in FIGS. 6 and 7, a number of coolant flow passages 82 are formed through the gear body 60 of the cooling ring gear 40. In the illustrated embodiment, each coolant flow passage 82 includes an axial flow passage section 84 and a radial flow passage section 86, which intersects the axial flow passage section 84 at a predetermined angle. Each axial flow passage section 84 extends axially into annular gear body 60 from annular face 68 and may or may not penetrate opposing side face 70. The number and spacing of the axial flow passage sections 84 will vary between embodiments; however, by way of example, the cooling ring gear 40 may include ten such axial flow passage sections 84 having a substantially constant angular spacing of 36° in one embodiment. The axial flow passage sections 84 further extend into the annular gear body 60 from side face 68 without breaching the first and second annular sides (that is, the inner 64 and outer 66 circumferential surfaces) of the annular gear body 60.

The radial flow passage sections 86 extend radially into the gear body 60 from the outer circumference surface 66 and, specifically, from the outer splined periphery 76. The radial flow passage sections 86 extend into the gear body 60 to a depth sufficient to intersect the associated axial flow passage section 84, but each has a length less than the radial thickness of the gear body 60. The radial flow passage sections 86 consequently terminate prior to penetrating the inner toothed periphery 78 and may terminate at the axial flow passage sections 84 in certain embodiments. As indicated in FIGS. 6 and 7, the radial flow passage sections 86 may intersect axial flow passage sections 84 at approximately a midway point, as taken along rotational axis 72. Additionally, each radial flow passage section 86 may intersect its associated axial flow passage section 84 at substantially a right angle. In this case, each coolant flow passage 82 may be imparted with a substantially T-shaped cross-sectional geometry, as taken along a cross-section plane extending through the flow passage and containing the rotational axis 72. In further embodiments, the radial flow passage sections 86 may intersect axial flow passage sections 84 at different locations, at different angles, and/or two or more radial flow passage sections 86 may intersect each axial flow passage section 84. Further, the axial 84 and radial 86 flow passage sections may each extend along a nominally axial or radially path that is not precisely aligned with respect to its true radial or axial direction. For example, the axial flow passage section may extend in parallel or at an oblique angle with respect to the rotational axis 72.

The cooling ring gear 40 is may include at least one coolant collection or "catch" feature in fluid communication with the coolant flow passages 82. The coolant collection feature or features may gather coolant during rotation of the cooling ring gear 40 to provide a volume of coolant from which the coolant flow passages 82 may draw a steady coolant supply. In the example embodiment shown in FIGS. 4-7, the cooling ring gear 40 includes an inner annular groove or annulus 88, which serves as such a coolant collection feature. The annular groove 88 is formed in the inner circumferential surface 64 at a location axially adjacent the inner toothed periphery 78, axially adjacent side face 68, and substantially opposite the side face 70 of the cooling ring gear 40. The annular groove 88 intersects and fluidly couples the axial flow passage sections 84 of the coolant flow passages 82. In this regard, each axial flow passage section 84 may extend from the side face 70, axially into annular gear body 60, and to annular groove 88. The axial flow passage sections 84 may terminate at annular groove 88 to avoid breaching the side face 70 of the annular gear body 60 and thereby provide a continuous annular lip 90 (identified in FIG. 7), which helps to retain coolant within the annular groove 88 during rotation of the cooling ring gear 40. In other embodiments, the cooling ring gear 40 may include other depressions or recesses formed in the inner circumferential surface 64, in fluid communication with the axial flow passage sections 84 of the coolant flow passages 82, and serving as coolant collection features during rotation of the cooling ring gear 40.

The axial 84 and radial 86 flow passage sections may each be non-penetrating or "blind" bores, which are drilled into the annular gear body 60 during manufacture of the cooling ring gear 40. The annular gear body 60 itself may be cast as a preform or near net shape and then subject to machining to define the more detailed geometric features thereof. When included within the cooling ring gear 40, the annular groove 88 may be formed prior to or after the axial 84 and radial 86 flow passage sections by turning or another material removing process. In other embodiments, the cooling ring gear 40, the coolant flow passages 82, and the annular groove 88 (if present) may be formed utilizing various other manufacturing techniques.

During operation of the planetary transmission 12 (FIG. 2), the cooling ring gear 40 is contacted by oil or another liquid coolant at one or more surfaces of the annular gear body 60, including side faces 68 and 70, and the surfaces defining the annular groove 88. As the cooling ring gear 40 rotates, centrifugal forces draw coolant into the axial flow passage sections 84 at the junctures or ports formed between the axial flow passage sections 84 and the annular groove 88. Such ports thus serve as inlets of the coolant flow passages 82 during rotation of the cooling ring gear 40. Additionally, coolant may also be drawn into the axial flow passage sections 84 at the junctures or ports formed between the axial flow passage sections 84 and the side face 70 of the annular gear body 60. The ports of axial flow passage sections 84 formed at the side face 70 may likewise be considered inlets of the coolant flow passages 82. From the axial flow passage sections 84, the liquid coolant flows into the radial flow passage sections 86 and is ultimately discharged by the ports of the radial flow passage sections 86 formed in the outer circumferential surface 66 of the annular gear body 60. The ports of the radial flow passage sections 86 formed in the outer circumferential surface 66 thus serve as outlets of the coolant flow passages 82 during rotation of the cooling ring gear 40. As may be seen in FIGS. 6-7, the outlets of the coolant flow passages 82 radially overlap or align with the inner toothed periphery 78 of the cooling ring gear 40; that is, each flow passage outlet aligns with the inner toothed periphery 78 as taken along a radius of the cooling ring gear 40. Comparatively, the inlets of the coolant flow passages 82 are spatially offset or remotely located relative to the inner toothed periphery 78.

Figure 3:
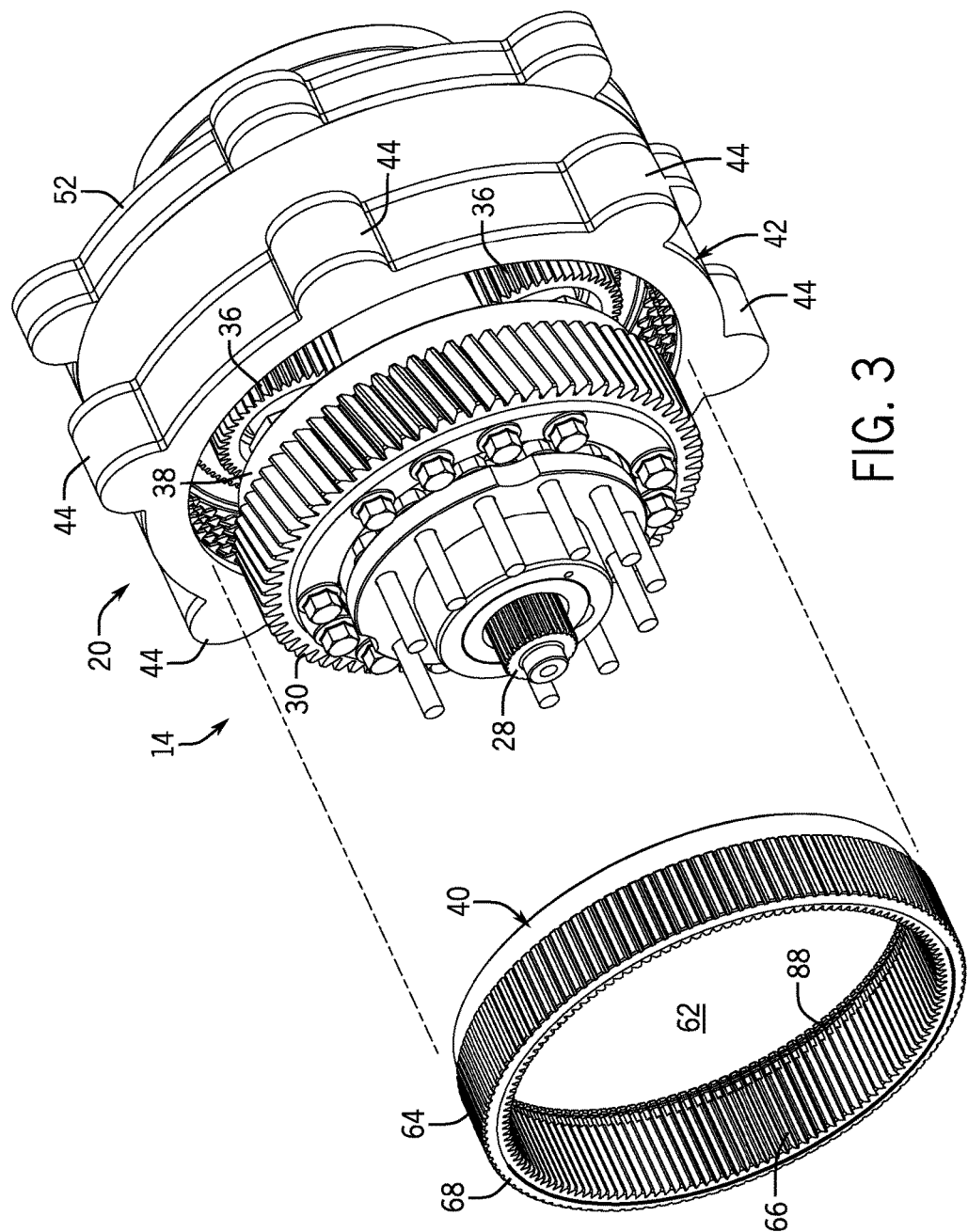
FIG. 3 is a partially exploded view of a planetary gear set included within the planetary transmission shown in FIG. 2 and containing a cooling ring gear, as illustrated in accordance with a further example embodiment of this disclosure.
Figure 4:
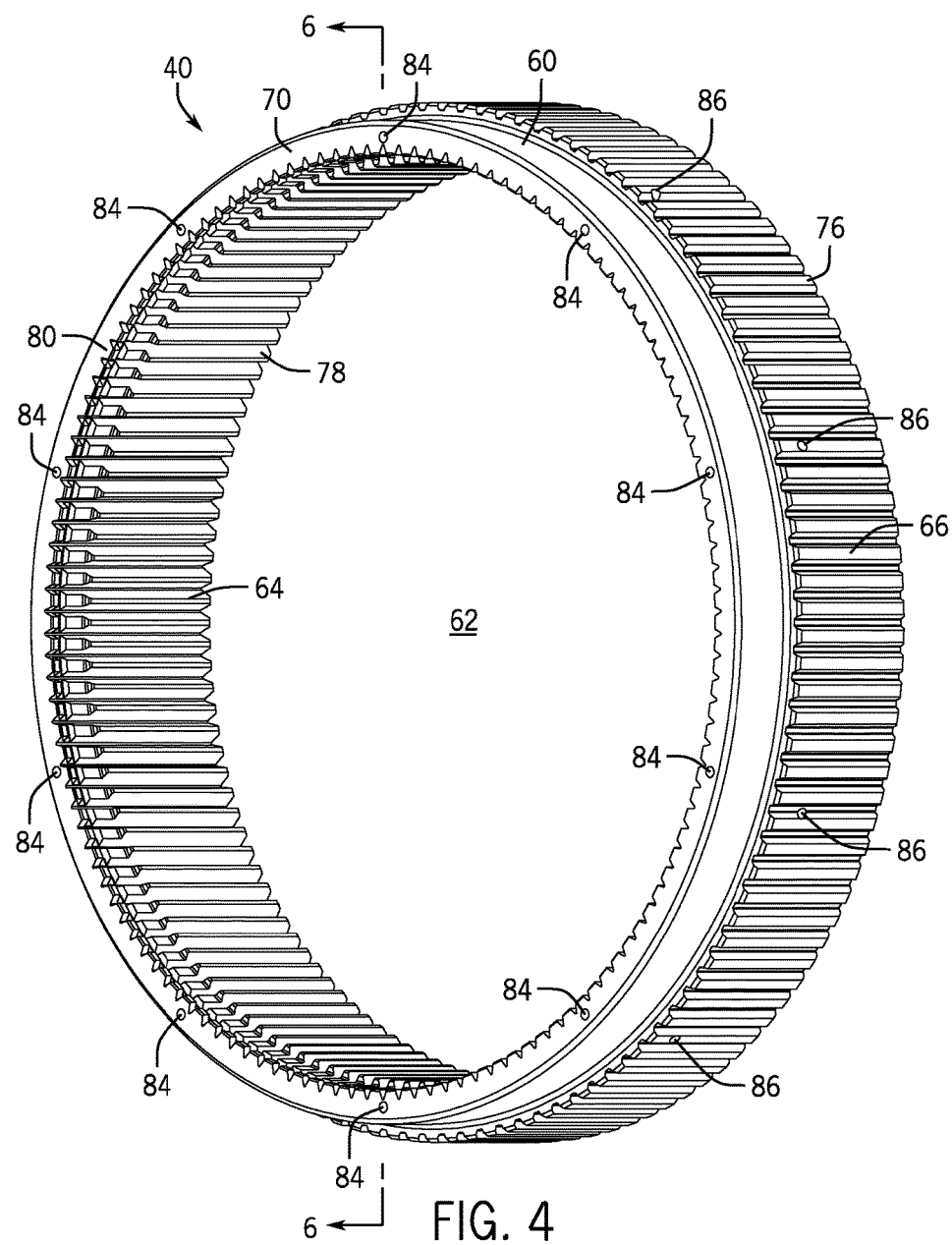
FIGS. 4 and 5 are isometric views of the cooling ring of FIG. 3, shown from opposite axial sides.
Figure 5:
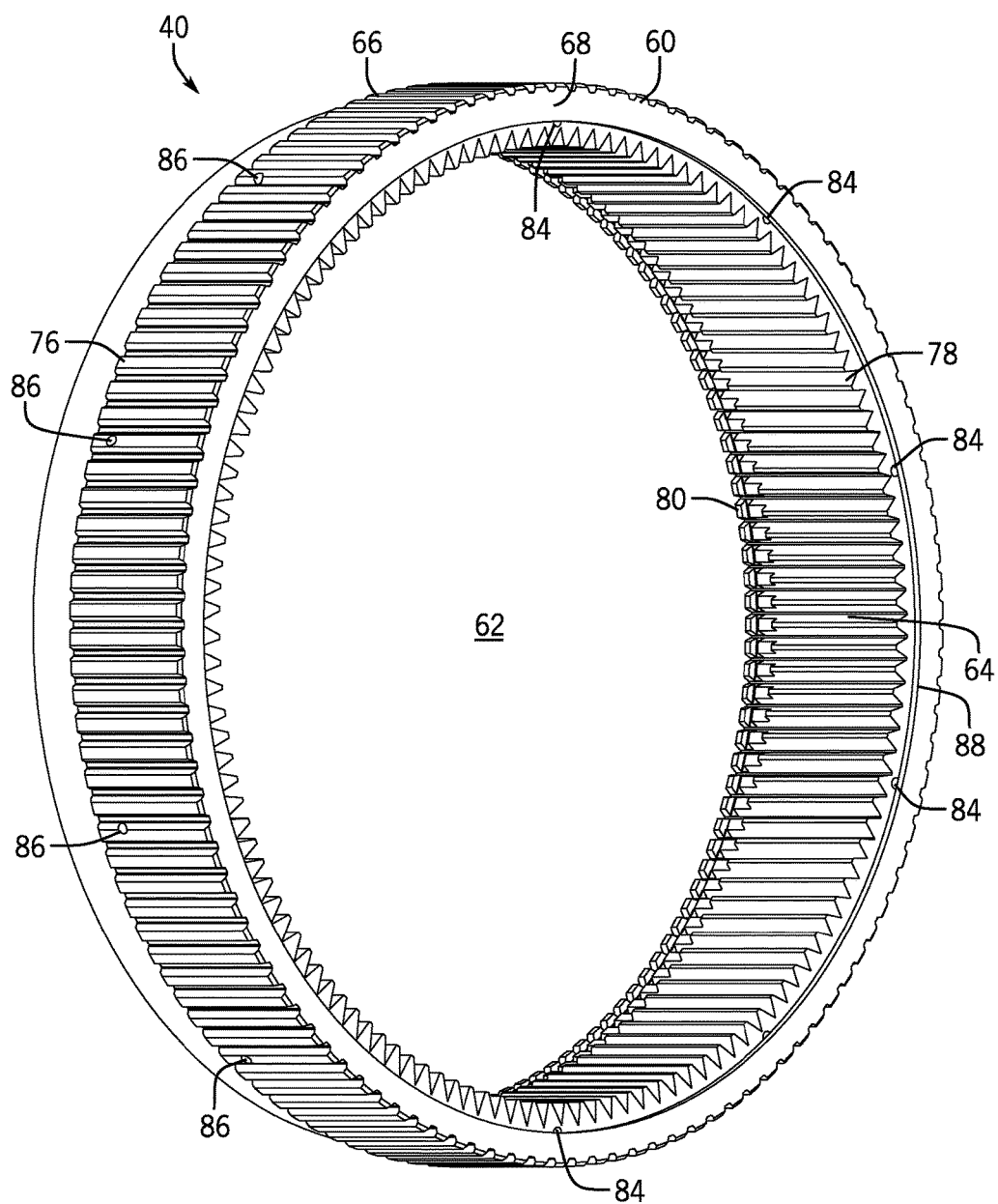

By virtue of their location and the centrifugal forces generated during ring gear rotation, the outlets of the coolant flow passages 82 discharge coolant flow in a radially outward direction. Thus, during rotation of the cooling ring gear 40, active streams or jets of coolant are delivered or splashed into the interior of the disc pack 42 (FIGS. 2-3). The coolant contacting the disc pack 42 conductively removes excess heat from the disc pack 42 to provide the desired heat dissipation and improve the overall thermal performance of the planetary transmission 12 (FIG. 2). Additionally, as the outlets of the coolant flow passages 82 are located within and distributed about the splined periphery 76 in the illustrated example, the coolant flow passages 82 further discharge liquid coolant directly into the splined interface between the cooling ring gear 40 and the disc pack 42. This, in turn, may further minimize frictional heating and reduce component wear in embodiments in which oil or another lubricating liquid is used as the coolant.

There have thus been described embodiments of a cooling ring gear, which is advantageously utilized within a planetary gear set or a larger planetary transmission suitable for usage within a work vehicle. The cooling ring gear includes coolant flow passages, which may be angularly distributed or positioned around the rotational axis of the cooling ring gear. During rotation of the cooling ring gear, the coolant flow passages intake coolant and direct active coolant flow to nearby components of a transmission (e.g., surrounding friction packs) for purposes of enhanced heat dissipation and/or lubrication. The coolant flow passages are drilled into or otherwise strategically formed within the annular gear body to avoid penetration of the gear teeth of the cooling ring gear. This eliminates penetration of the meshing surfaces of the ring gear and reduces manufacturing complexity as compared to other ring gears having radial through bores. Embodiments of the cooling ring gear may also advantageously include an inner annular groove or other coolant collection feature, which helps direct additional coolant flow into the coolant flow passages to further enhance the lubricant distribution capabilities of the ring gear.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A ring gear for a planetary gear set, comprising:
    an annular gear body having a first annular side and a second annular side concentric about a center axis, the first annular side defining a toothed periphery and the second annular side defining a non-toothed periphery; and
    a coolant flow passage formed in the annular gear body, the coolant flow passage including:
        an axial flow passage section extending axially into the gear body without intersecting the first and second annular sides; and
        a radial flow passage section extending radially into the gear body from the second annular side to the axial flow passage section.

2. The ring gear of claim 1, wherein the gear body includes an annular groove in the first annular side proximate a first axial side of the gear body; and
    wherein the axial flow passage section extends from the annular groove to a second axial side of the gear body.

3. The ring gear of claim 2, wherein the first annular side is an inner circumferential surface of the gear body and the second annular side is an outer circumferential surface of the gear body.

4. The ring gear of claim 2, wherein the annular groove is axially adjacent the toothed periphery.

5. The ring gear of claim 2, wherein the second annular side has a splined periphery.

6. The ring gear of claim 2, wherein the first annular side has a splined periphery adjacent the toothed periphery.

* * * * *